Sept. 1, 1925.
E. BUGATTI
1,551,976
VEHICLE WHEEL
Filed Jan. 8, 1925
FIG. 1
FIG. 3
FIG. 4
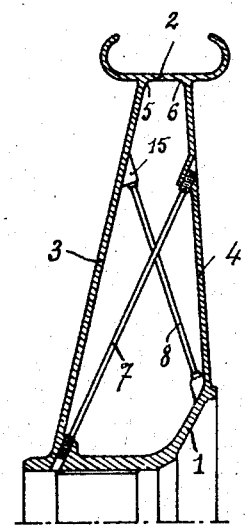
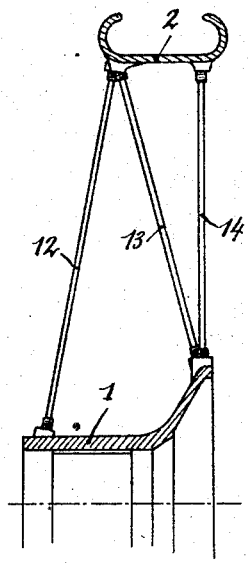
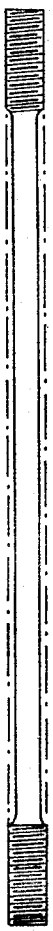
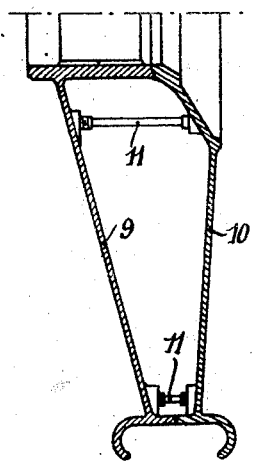
FIG. 2
Inventor
Ettore Bugatti
By Mauro, Cameron, Lewis & Kerkam
Attorneys Patented Sept. 1, 1925.

1,551,976

UNITED STATES PATENT OFFICE.

ETTORE BUGATTI, OF MOLSHEIM, FRANCE.

VEHICLE WHEEL.

Application filed January 8, 1925. Serial No. 1,267.

*To all whom it may concern:*

Be it known that I, ETTORE BUGATTI, a subject of the King of Italy, and a resident of Molsheim, Bas-Rhin Department, France, have invented new and useful Improvements in Vehicle Wheels, which is fully set forth in the following specification.

The known types of vehicle wheels with spokes consist of three parts, the hub, wheel rim and spokes. In order to obtain an accurate centering of the wheel, the spokes are stretched in a practically uniform manner, the tension being observed by the sound produced during their vibration.

But such wheels are attended with a drawback, for when the wheel rim is subjected to a shock in either direction, the spokes will undergo a certain tension which added to the latent tension in the wheel will easily attain the limit of rupture.

In cast wheels, in which the web or the portion connecting the wheel rim to the hub is cast in one with the said rim and hub, the same inconvenience is found, for when the piece becomes cooled, internal tensions will be produced which are due to the differences in the shrinkage of the various parts of the wheel.

The present invention relates to the construction of light wheels in which the spokes are mounted after the manner of the stay-bolts of locomotive boilers, the different parts of the wheel being assembled by means of long screwthreaded rods whereof each end is attached to a respective part of the wheel, whereby the latent tensions observed in the known wheels will be eliminated.

The said invention further relates to the strengthening of wheels of the known types by means of the above-mentioned screwthreaded rods.

The following description, with reference to the appended drawings, which are given by way of example, sets forth the said invention.

Fig. 1 is a sectional view of a cast wheel comprising a web.

Fig. 2 is a like view of a wheel which is cast in two parts.

Fig. 3 shows a screwthreaded connecting rod.

Fig. 4 shows a wheel which is entirely constructed according to the principle of the invention.

As shown in Fig. 1, the wheel is cast in a single piece; the hub 1 and the rim 2 are connected together by two plain or apertured webs 3 and 4; by reason of the different degrees of shrinkage which occur during the cooling of the piece, tractive stresses are produced which diminish the resistance of the wheel to shocks and tend to cause breakage at the points 5 and 6.

In order to obviate this drawback, it is proposed, according to the invention, to strengthen the wheel by means of the spokes 7 and 8; said spokes as shown in Fig. 3, are constructed as follows. An iron rod is cut to the proper length and is screwthreaded upon the entire length. In order to lighten the said spokes, a certain portion of the screw thread is removed, leaving only the ends of the rod screwtheaded.

The wheel is provided at the proper places with the bosses 15. The bosses are drilled in pairs by means of a long drill and are then screwthreaded by the use of long taps. No tension is given to the said spokes and they will act under tractive stress in a more approved manner than a preliminarily stretched spoke.

Fig. 2 is a section of a wheel which is made in two parts 9 and 10, these being assembled by cross-pieces 11 which have the same construction as the aforementioned spokes.

Fig. 4 shows a wheel according to the invention in which the rim 2 is connected to the hub 1 by means of screwthreaded rods 12, 13, 14 which are attached without tension, as above stated.

What I claim is:

1. A device for the strengthening of cast metal wheels consisting of rods having screwthreaded ends cooperating with tapped holes provided in the walls of the wheel, no tension being exercised upon the said rods when in the normal position.

2. A device for the strengthening of cast metal wheels consisting of rods having two screw threaded ends cooperating with opposite parts of the wheel, no tension being exercised upon the said rods when in the normal position.

3. A cast metal wheel comprising screwthreaded rods which are screwed into the walls of said wheel, no tension being exercised upon the said rods when in the normal position.

4. A cast metal wheel comprising rods upon which no tension is exercised when in the normal position, and which are adapted to connect the walls of the wheels.

5. A device of the class described comprising cast wheel portions provided with bosses having openings therethrough and a plurality of rods extending into said openings and having threaded engagement with said bosses, said rods normally having no tension thereon.

In testimony whereof I have signed this specification.

ETTORE BUGATTI.